J. P. LAVIGNE.
STEERING GEAR.
APPLICATION FILED JAN. 26, 1917. RENEWED MAR. 10, 1919.
1,319,294.  Patented Oct. 21, 1919.
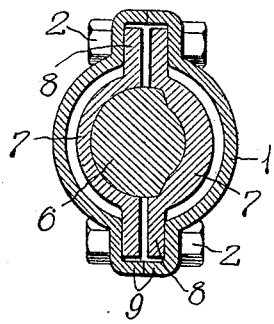
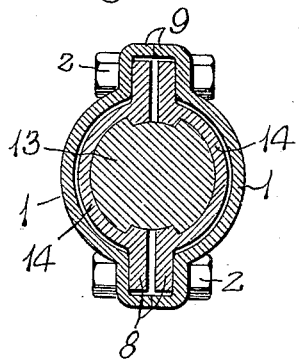
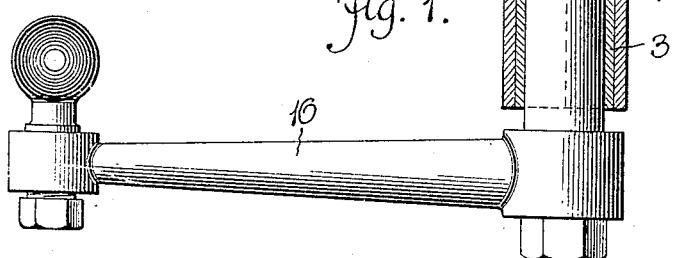
Witness
Chas. W. Stauffiger
Anna M. Dorr
Inventor
Joseph P. Lavigne,
By
Attorneys

UNITED STATES PATENT OFFICE.

JOSEPH P. LAVIGNE, OF DETROIT, MICHIGAN, ASSIGNOR TO DETROIT MECHANICAL ENGINEERING COMPANY, OF DETROIT, MICHIGAN, A CORPORATION OF MICHIGAN.

STEERING-GEAR.

1,319,294.     Specification of Letters Patent.     Patented Oct. 21, 1919.

Application filed January 26, 1917, Serial No. 144,623. Renewed March 10, 1919. Serial No. 281,792.

*To all whom it may concern:*

Be it known that I, JOSEPH P. LAVIGNE, a citizen of the United States of America, residing at Detroit, in the county of Wayne and State of Michigan, have invented certain new and useful Improvements in Steering-Gears, of which the following is a specification, reference being had therein to the accompanying drawings.

In the operation of steering gears for automobiles or the like and more particularly for those used for heavy service such as trucks and tractors, it is desirable not only that the device be self locking to avoid turning save under the manipulation of the operator, but also that it be arranged to avoid internal end thrusts which are likely to be extremely great in such mechanism with the consequent loss of power through friction and the ever present liability to injury.

This invention relates to a steering gear for automobiles or the like and to an arrangement thereof whereby the device is not only self locking, but whereby the end thrust is avoided.

The invention consists in the matters hereinafter set forth, and more particularly pointed out in the appended claims.

In the drawings,

Figure 1 is a view, partially in longitudinal section and partially in elevation, of the mechanism of a steering device that embodies features of the invention;

Fig. 2 is a view in transverse section thereof taken on line II—II of Fig. 1, and Fig. 3 is a view in transverse section thereof taken on or about line III—III of Fig. 1.

Referring to the drawings, a casing formed of oppositely disposed sections 1 secured together as by studs 2 or other suitable means, carry bushings 3 in the cylindrical sleeved ends thereof. A driving member 4 is journaled in the upper bushing 3, a shoulder 5 being formed thereon to prevent displacement, but not being arranged as a heavy thrust bearing. A double or diamond screw as indicated at 6, is formed on the inner portion of the shaft 4 and is engaged by correspondingly internally threaded sectors 7 having extensions 8 that enter into guide grooves formed by flanges 9 of the sections 1 and thus are prevented from rotation in the casing.

The sectors 7 are so arranged that rotation of the shaft 4 in one direction shifts one segment toward and the other away from the bushing 3, and vice versa.

A follower shaft 10 is journaled in the lower bushing 3 with a slight shoulder 11 formed thereon to prevent accidental displacement in the bushing. The upper reduced end portion 12 of this shaft is stepped in the suitably arranged end portion of the drive shaft 4.

A double or diamond worm thread such as indicated at 13 is formed on the inner portion of the shaft 10 and is engaged by a couple of correspondingly internally threaded segments 14, the upper end portions 15 of which are screwthreaded on to the sector 7, the extensions 8 being held by the engagement thereof in the hollow flanges 9, thus preventing rotation in the casing 1.

The angle of effectiveness of the screw threads of the power shaft is such that on rotation of the latter the sectors 7 move in opposite direction. The angle of efficiency of the worm threads on the driven shaft is such that the consequent longitudinal movement of the segments 14 thereon rotates the power shaft. This motion is transmitted as by the arm 16 or like means to the steering arm of the wheel.

One result of this arrangement is that there is no end thrust in the device itself, the thrust of the sectors in one direction being obviated by the reverse thrust of the companion sectors. Because of the worm thread the device is locked against rotation save by turning the power shaft.

Obviously, changes in the details of construction may be made without departing from the spirit of the invention and I do not care to limit myself to any particular form or arrangement of parts.

What I claim is:—

1. In a steering gear, a power shaft having a diamond-screwthreaded-portion, a follower shaft having a diamond-threaded-worm alined therewith, and means reciprocating simultaneously in opposite directions longitudinally on the shaft by the rotation of the screwthreaded portion which they engage and acting in unison on the worm to turn the follower shaft.

2. In a steering gear, a power shaft having a diamond-screw-threaded-portion, a follower shaft having a diamond-threaded-worm alined therewith, means reciprocating simultaneously in opposite directions on the power shaft by the rotation of the screwthreaded-portion which they engage, and operating the worm, and means housing the reciprocating members and preventing them from rotation in relation to the worm.

3. In a steering gear, a power shaft having a diamond-screwthreaded-portion, a follower shaft having a diamond-threaded-worm alined therewith, oppositely disposed sectors gripping the screwthreaded portion of the power shaft between them and moving in opposite directions when the shaft is rotated, segments each secured to a sector and engaged by the worm, and a casing housing the segments and sectors and maintaining them from rotation in relation to the shaft.

4. In a steering gear, a casing, a power shaft having a diamond-screwthreaded-portion, a follower shaft having a diamond-threaded-worm in alinement with the power shaft, and means longitudinally reciprocable and non-rotatable in the casing engaging the screwthreaded portion to travel in opposite directions on the power shaft and engaging the worm to rotate the follower shaft.

5. In a steering gear, a casing formed of opposed sections and provided with longitudinal guideways, a bushing near each end portion of the casing, a power shaft journaled in one bushing, a diamond-threaded portion thereof lying in the casing, a follower shaft journaled in the other bushing with a diamond-threaded worm thereon within the casing, oppositely moving sectors engaging the screwthreads and reciprocating in the casing guideways, and segments each connected to a sector and engaged in the worm and the casing guideways.

In testimony whereof I affix my signature in the presence of two witnesses.

JOSEPH P. LAVIGNE.

Witnesses:
 ANNA M. DORR,
 CHAS. W. STAUFFIGER.

Copies of this patent may be obtained for five cents each, by addressing the "Commissioner of Patents. Washington, D. C."